Jan. 6, 1970     O. G. HILLERNS     3,487,755
METHOD AND DEVICE FOR FORMING AND SEALING
CLOSURES IN THERMOPLASTIC BAGS
Filed April 14, 1966     2 Sheets-Sheet 1

INVENTOR
OSWALD G. HILLERNS
BY
ATTORNEY

INVENTOR
OSWALD G. HILLERNS
BY
ATTORNEY

United States Patent Office 3,487,755
Patented Jan. 6, 1970

3,487,755
METHOD AND DEVICE FOR FORMING AND
SEALING CLOSURES IN THERMOPLASTIC
BAGS
Oswald G. Hillerns, Plainfield, N.J., assignor to Union
Carbide Corporation, a corporation of New York
Filed Apr. 14, 1966, Ser. No. 542,512
Int. Cl. B31b 1/64, 49/04; B65b 7/20
U.S. Cl. 93—27                              9 Claims

ABSTRACT OF THE DISCLOSURE

Method and apparatus for sealing the flaps of an industrial bag is provided wherein the flaps are folded into overlapping position by a pair of rolls; the rolls are removed, the flaps are held in the overlap position by a taut, heat-conductive curtain attached to one of the rolls, and the overlapping flaps are heat sealed through the curtain.

This invention relates to a device for forming and sealing closures in thermoplastic bags and a method in connection therewith. More particularly, this invention relates to a method and device for forming and sealing end closures in square-end heavy-walled thermoplastic industrial shipping bags.

Thermoplastic film of proper thickness has adequate impact, tear and tensile strengths for use as a bag forming material in the construction of heavy-duty bags useful for packaging and shipping bulk quantities of the order of 50 to 100 pounds of granular quantities such as fertilizers, molding powders, dyes and pigments and food stuffs such as sugar, beans, flour and the like. In contradistinction to the older conventional bag forming materials such as woven fabric or multi-ply paper, a thermoplastic film provides superior protection against vermin, the accidental wetting of the package commodity, loss and gain in moisture content and minimum loss of finely divided materials as by sifting through seams or closures.

These advantages of thermoplastic film as a material of construction for heavy-duty bags have been appreciated by the art in the development of heavy-duty square-end bags. Such heavy-duty bags are fabricated from heavy-gauge thermoplastic film, generally in the order of 5 to 10 mils, which require strong heat seals at the ends. However, present day methods and devices for forming and heat sealing end closures in square-end bags of heavy-walled of gauge film have not consistently provided satisfactory heat seals. Frequently the folds are wrinkled as opposed to smooth and flat. Consequently, even and continuous heat seals are not always possible.

A typical present day method for forming and sealing end closures in bags of the above type is as follows: the end of such a bag which has been previously blanked is sealed by overlapping the side flaps by means of rollers and the like and holding these flaps in this overlapping relationship while they are heat sealed together. Because they must remain in place while the heat seal is being made, the rollers have to be short enough to clear the sealing platen and located so as not to obstruct the areas to be sealed. These limitations prevent positive securing of the folded flaps in the desired position before the sealing platen is applied. This applies more particularly to the extremities of the flaps which the rollers cannot be made long enough to control because of the required seal pattern. Consequently, poor end folds and seals frequently result from those limitations.

Accordingly, it is an object of the present invention to provide a method and device for forming and sealing end closures in square-end heavy-walled thermoplastic industrial shipping bags which avoid the aforementioned shortcomings of present day methods and devices.

In accordance with the method, at least one end of a themoplastic industrial bag is blanked in order to form a pair of opposing end flaps and a pair of opposing side flaps. The body of the bag is then positioned in such a way that at least one of the end flaps is infolded over an internal (to the bag) former and the side flaps are outfolded over folding means. The side flaps are then sequentially infolded by the folding means in overlapping relationship to each other over the internal former and are retained in overlapping relationship by the folding means while they are heat sealed to each other and to at least one end flap without interfering with the heat sealing operation.

In carrying out the method of the invention a device for forming and sealing end closures in square-end industrial shipping bags is provided. The device comprises means for securing the body of said bag at least one end of which has been blanked to form a pair of opposing end flaps and a pair of opposing side flaps such that at least one of the opposed end flaps is infolded over internal forming means and the side flaps are outfolded over folding means. The folding means are adapted to sequentially infold the opposing pair of side flaps in overlapping relationship to each other over the end flap and internal forming means and are adapted to retain the side flaps in their overlapping relationship without obstructing with the heat sealing operation. Lastly, means are provided to heat seal the infolded side flaps.

Figure 1:
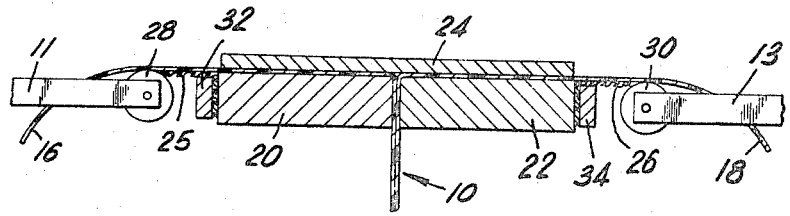
FIG. 1 is an end elevational view partly in section of a device embodying the invention showing an industrial thermoplastic shipping bag and a former in place.
Figure 4:
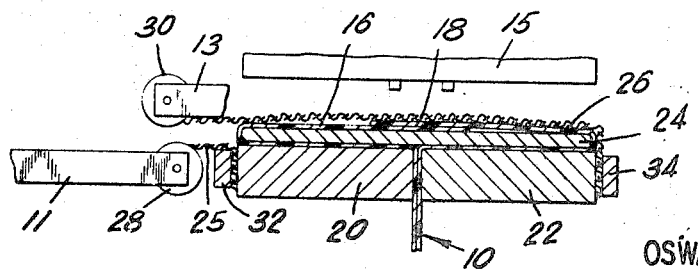
FIG. 4 is a similar view of the device of FIG. 1 showing a still further stage of operation.
Figure 5:
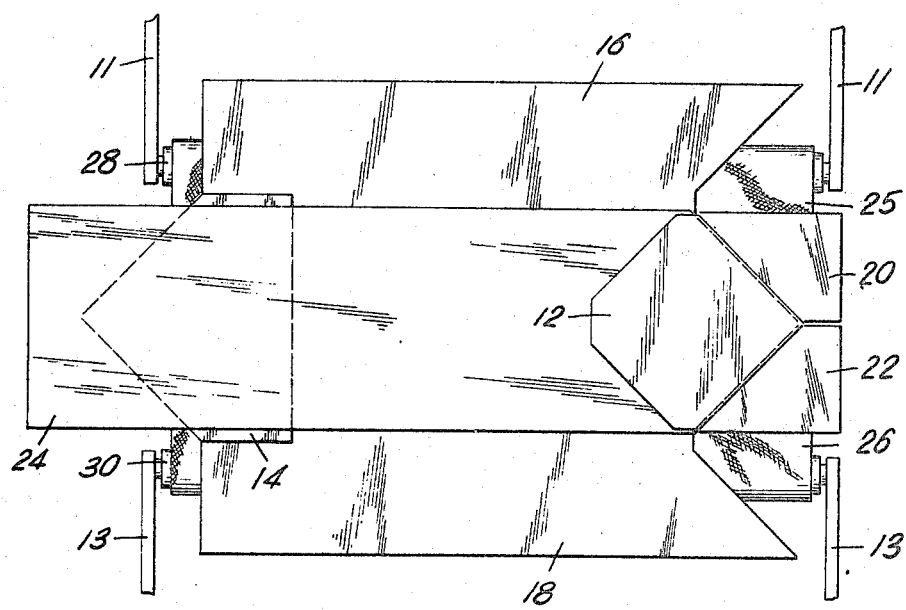
FIG. 5 is a plan view partly in section of the device of FIG. 1 showing the stage of operation of FIG. 1.
Figure 7:
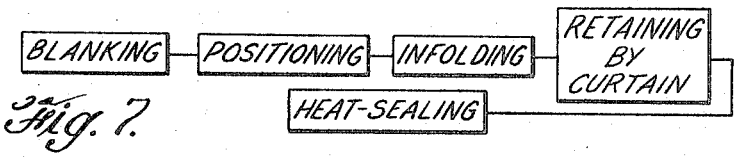
FIG. 7 is a block diagram of the preferred method.

Referring now to the drawing, as shown in FIGS. 1 and 5, the device of the invention includes a thermoplastic industrial shipping bag 10, one end of which having a pair of opposing end flaps 12, 14 and a pair of opposing side flaps 16, 18; a pair of clamping bars 20, 22, or split-platen and an internal former or heat-resistant platen 24. The purpose of the heat-resistant platen 24 is to prevent the heat sealing of the overlapped side flaps 16 and 18 (FIGURES 1-4) from extending to other portions of the bag such as the side walls. It is preferred to use an internal former covered with silicone rubber because uniform sealing pressures are achieved and no high spots are experienced. The device further includes a pair of folding curtains 25, 26, one end of each being attached to one of a pair of spring-wound rollers 28, 30, respectively in the manner of a roll-up window shade. Each of the rollers is held by mechanically-actuated arms 11, 13. The other end of each folding curtain is attached to each of the clamping bars 20, 22 at 32, 34 respectively along a line adjacent to one of the parallel edges of the former 24 when it is in position.

As further shown in FIGS. 1 and 5 when the device is in operation, the bag 10 is secured between the clamping bars 20, 22 with end flap 12 infolded over former 24 and end flap 14 infolded under the former 24. The opposing side flaps 16, 18 are outfolded across the top surfaces of the clamping bars 20, 22 and the rollers 28, 30. The internal former 24 which is secured to a conventional mounting carriage is allowed to rest on the opposing side flaps parallel to the clamping bars. Note that the device is shown in a horizontal plane. However, the device is also operable in a vertical plane and therefore the top surfaces of the clamping bars 20, 22 become the side surfaces.

Figure 2:
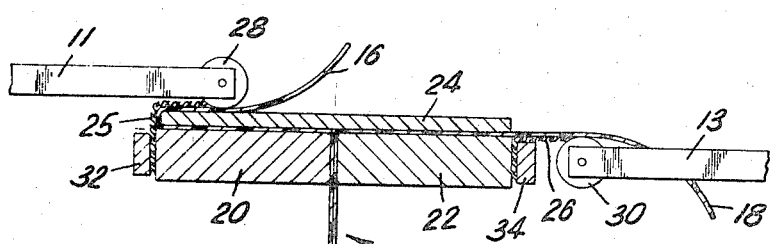
FIG. 2 is a similar view of the device of FIG. 1 showing another stage of operation.
Figure 6:
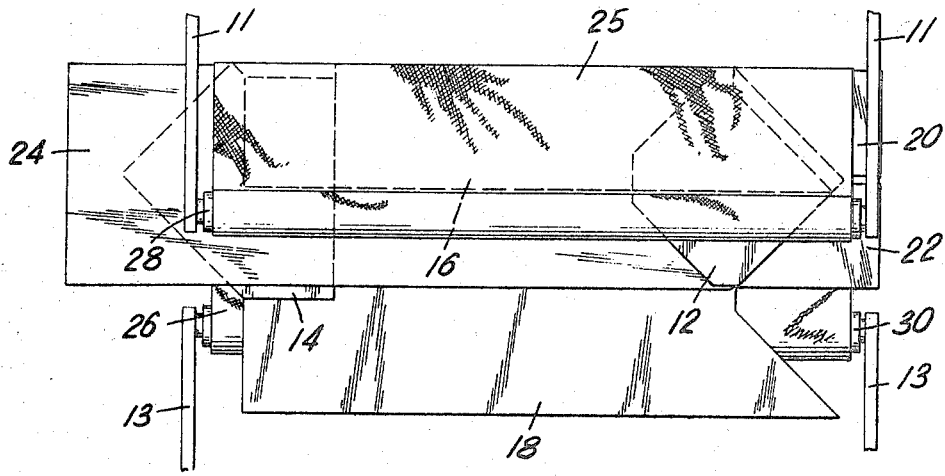
FIG. 6 is a similar view of the device of FIG. 5 showing another stage of operation.

To fold a bag flap, as shown in FIGS. 2 and 6, the roller 28 is raised above the clamp 20 and former 24 and rolled over the former, against which it is pressed by spring tension. The folding curtain 26 is pulled taut against the edge of the former 24 as it unwinds from its roll 28.

Figure 3:
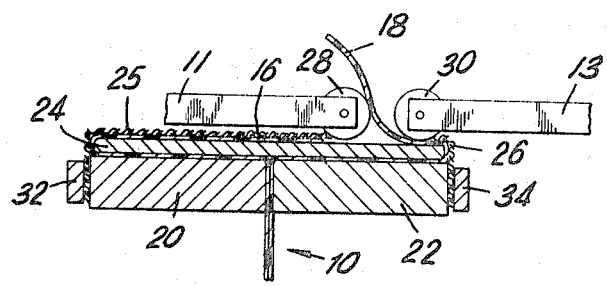
FIG. 3 is a similar view of the device of FIG. 1 showing a further stage of operation.

Now looking at FIG. 3, as the first roll 28 completes its stroke across the former 24, folding the first flap 16, the other roll 30 similarly rises above the clamp 22 and rolls across the former 24 in the opposite direction thereby folding the second flap 18 and pushing the first roll 28 back ahead of it. During the backward stroke of the first roll 28, the curtain 26 remains taut as it winds up on its roll 28. Both flaps 16, 18 are now held in place by the second roll 30 and curtain 26 (FIG. 4). Thereupon, a suitable heated sealing platen 15 is lowered and the flaps are heat-sealed through the curtain to each other and to end flap 14. Thus no obstruction exists for the sealing platen, which can be of much simpler design than in present day devices. After sealing, the heated platen 15 is raised, the second folding curtain 30 rolled back to its recess and the internal former 24 is withdrawn.

The device of the invention is simple and of low cost as compared to present day devices for making the folds in thermoplastic bags. Furthermore, the device allows for good utilization of the parallel edges of the former as guides for making the folds and also permits positive securing of the folded flaps in the desired position before the sealing platen is applied, especially at the extremities of the flaps. Thus, excellent end folds and seals are realized. Another advantage of the present invention is that the same set of folding rollers can be used for every size of bag ends, thus, a bag manufacturer is provided with the convenience and the cost saving of having merely one set of folding rollers instead of different sets for different sizes of bag ends. A further advantage of the folding curtain over present day devices is that, after sealing, the peeling off of the second curtain as it rolls back is gentle on the hot film and avoids tearing of the seal which sometimes occurs because of sticking when a conventional heated platen is pulled away from the work.

While a comparable material can be employed, it is preferred to fabricate the folding curtans from Teflon-coated glass cloth of about 5-mil thickness. This material which is flexible and durable, is most desirable because it is heatproof and prevents the sealing platen from sticking to the thermoplastic film. Note that this requirement does not apply to the first folding curtain, which does not come in contact with the sealing platen and therefore could be made of some other suitable material or fabric. Also, the folding curtains being fabricated as above, eliminates covering the sealing platen in a like manner. Therefore, the sealing platen can be of much simpler design than present day sealing platens.

What is claimed is:
1. Apparatus for forming and sealing a closure in an industrial shipping bag, comprising:
    (a) a split platen for securing the body of said bag at least one end of which has been blanked to form a pair of opposed end flaps and a pair of opposed side flaps;
    (b) a heat-resistant platen for folding any of said flaps thereover;
    (c) means for infolding at least one of said end flaps over said heat-resistant platen;
    (d) a pair of opposed folding curtains which are wound on spring-loaded rolls for infolding said side flaps into overlapping relationship over said heat-resistant platen, said curtains being windable and unwindable about said rolls when said rolls are advanced and retracted, one end of each curtain being secured to opposite edges of said split platen, said spring-loaded rolls being rotably mounted parallel to the width of said bag and positioned adjacent the outer edge of said side flaps, one of said curtains being adapted to be held tautly across the overlapped side flaps; and
    (e) a heat-sealing member for sealing said overlapped side flaps to each other.

2. The device of claim 1 wherein at least one of said folding curtains comprises a heat-resistant sheet.

3. The device of claim 2 wherein said heat-resistant curtain is a Teflon-coated glass cloth.

4. Apparatus for sealing flaps of a container comprising:
    (a) folding means for sequentially infolding an opposed plurality of said flaps into overlapped relationship over a platen comprising at least one spring wound roll,
    (b) at least one-heat-resistant, heat-conductive curtain adapted to tensely secure and overlay said overlapped flaps and through which said overlapped flaps are sealed, secured at one end to a point adjacent said flaps and secured at the other end thereof to said roll and windable thereon so that said curtain winds and unwinds thereon as said roll advances from and withdraws to the starting point,
    (c) flap securing means for moving said roll from its starting point and for tensely overlaying said overlapped flaps with said heat-conductive, heat resistant curtain, and
    (d) means for heat sealing said overlapped flaps to each other through said curtain.

5. The apparatus of claim 4 wherein said curtain is a polytetrafluoroethylene-coated glass cloth.

6. Method for forming and sealing end closures in heavy-walled thermoplastic industrial shipping bags which method comprises:
    (a) blanking at least one end of a thermoplastic industrial bag thereby forming a pair of opposing side flaps and a pair of opposing end flaps;
    (b) positioning the body of said bag in such a way that at least one of the end flaps are infolded over an internal former and the side flaps are outfolded over folding means;
    (c) sequentially infolding the side flaps in overlapping relationship to each other over the internal former;
    (d) retaining said side flaps in overlapping relationship by overlapping the side flaps with a heat-conductive, heat-resistant curtain under tension, and
    (e) heat sealing said side flaps to each other and to at least one end flap through said curtain.

7. Apparatus of claim 4 wherein said folding means is two spring-loaded rolls situated at opposed starting points adjacent said opposed flaps.

8. The apparatus of claim 7 having two curtains, one connected between each roll and its starting point, each curtain being unwindable and windable as its associated roll advances from and withdraws to its starting point.

9. The apparatus of claim 8 wherein said flap securing means comprises means for advancing the first roll and curtain to fold and secure one flap and means for advancing the opposed second roll and curtain toward said first roll to fold and secure the second flap in overlapped arrangement with said first flap and means for withdrawing said first roll and curtain to the respective starting point thereof as said second roll and curtain approaches until both rolls have moved substantially across said overlapped flaps, said second curtain unwinding and tensely securing said flaps.

References Cited

UNITED STATES PATENTS

| 2,898,720 | 8/1959 | Foley | 53—210 X |
| 2,904,100 | 9/1959 | Fener. | |
| 3,106,630 | 10/1963 | Klamp. | |
| 3,343,463 | 9/1967 | Nielsen | 93—35 |

WAYNE A. MORSE, JR., Primary Examiner

U.S. Cl. X.R

53—47, 375; 93—8, 35, 36; 156—289, 537; 161—89